A. J. BLAUVELT.
MOTOR PLOW.
APPLICATION FILED OCT. 24, 1914.
1,157,289.  Patented Oct. 19, 1915.
2 SHEETS—SHEET 1.
Fig. 1.
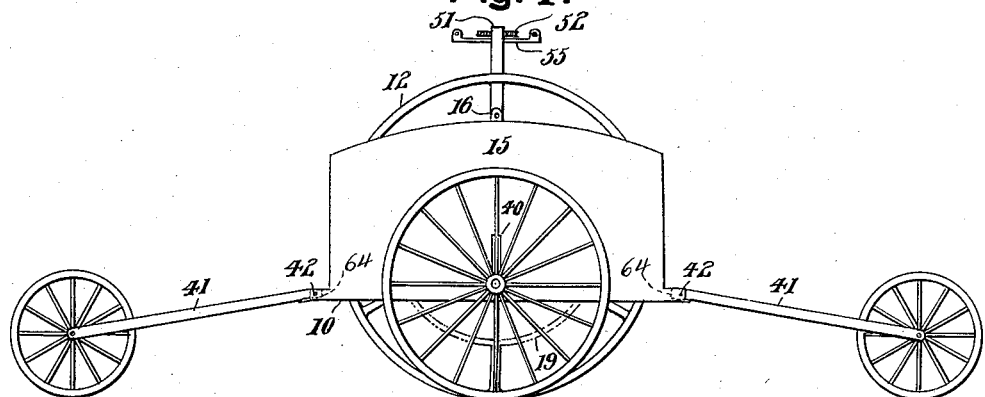
Fig. 2.
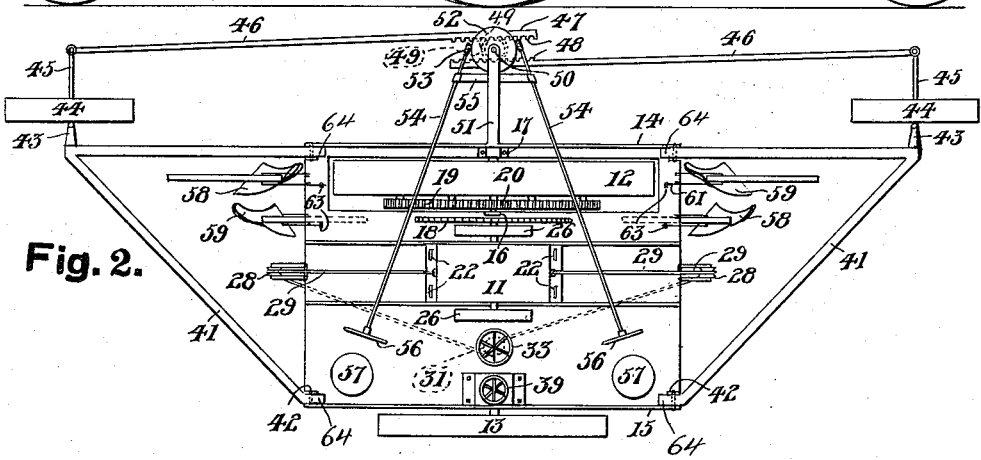
Fig. 3.
Witnesses
A. Hollander.
M. E. Lowry.
Inventor
Archie J. Blauvelt,
By T. A. Bryan, Attorney.

A. J. BLAUVELT.
MOTOR PLOW.
APPLICATION FILED OCT. 24, 1914.
1,157,289.
Patented Oct. 19, 1915.
2 SHEETS—SHEET 2.
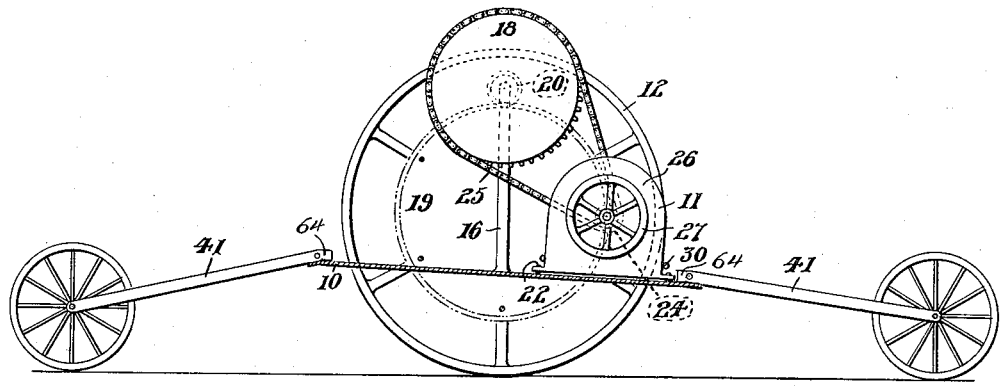
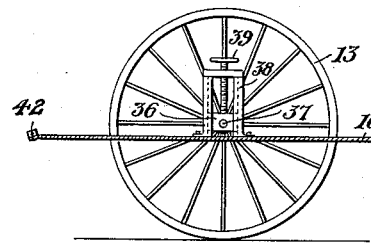
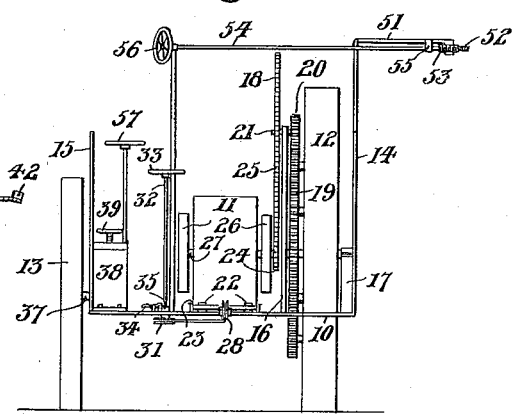
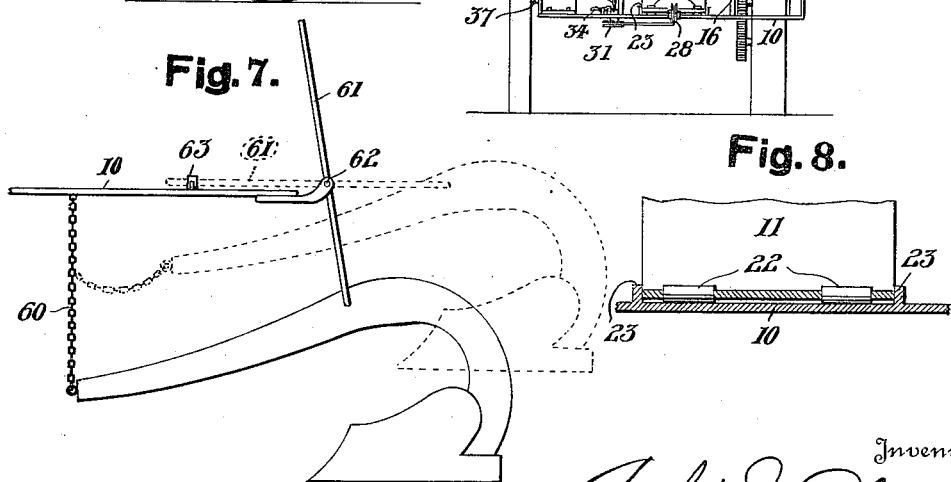
Witnesses
A. Hollander
M. E. Lowry
Inventor
Archie J. Blauvelt
By
T. L. Bryant
Attorney

UNITED STATES PATENT OFFICE.

ARCHIE J. BLAUVELT, OF ERIN, NEW YORK.

MOTOR-PLOW.

1,157,289.  Specification of Letters Patent.  Patented Oct. 19, 1915.

Application filed October 24, 1914. Serial No. 868,464.

*To all whom it may concern:*

Be it known that I, ARCHIE J. BLAUVELT, a citizen of the United States, residing at Erin, in the county of Chemung and State of New York, have invented certain new and useful Improvements in Motor-Plows, of which the following is a specification.

This invention relates to certain new and useful improvements in motor plows.

The primary object of the invention is to provide sets of non-alining plows at opposite ends of a motor-carrying platform and pointing in un-like directions, the same being arranged for alternate use by the different sets of such plows.

A further object is to provide a plurality of pairs of plows arranged for automatic operation and supported by a platform having a shiftable motor thereon and whereby the plow is driven in the desired direction upon the proper positioning of the motor at the desired end of the platform.

A still further object is to provide a motor driven plow capable of plowing two furrows across a field when the motor is at one end of its supporting platform and adapted to plow two other furrows across the field when returning in the opposite direction and at which time the motor is at the opposite end of the platform. For this purpose a sliding motor is provided which without the employment of reversing gears is positionable by mechanical means at either end of the machine platform and adapted to operate and thus propel the device forwardly of whichever end of the platform the motor is positioned. It is also designed so that the operator may adjust all of the mechanism and plow an entire field without leaving the machine platform.

With these general objects in view and others that will appear as the nature of the invention is better understood, the same consists in the novel combination and arrangement of parts to be hereinafter more fully described, illustrated in the accompanying drawings, and set forth in the appended claims.

In the drawings forming a part of this application and in which like-designating characters refer to corresponding parts throughout the several views, Figure 1 is a front elevation of the device with a portion of the elements removed. Fig. 2 is a top plan view of the device. Fig. 3 is a longitudinal sectional view thereof partially broken away, and with parts removed, with the motor centrally positioned. Fig. 4 is a similar view with some of the elements removed and with the motor operatively positioned at one end of the platform. Fig. 5 is an end view of the device with the guiding wheels and their mounting mechanism removed. Fig. 6 is a detail sectional view through the platform showing the wheel adjusting means. Fig. 7 is a detail view enlarged of one of the adjusting means for the plows, a plow being shown in its elevated position by dotted lines, and Fig. 8 is a detail view of the shiftable means for the motor.

Referring more in detail to the drawings, it is broadly designed to provide a platform 10 having a motor 11 of any desired construction mounted thereon and adapted to propel the device in either direction by imparting movement to the traction wheel 12 at one side of the platform, while an adjustable ground wheel 13 of lesser diameter is positioned at the opposite side thereof. The platform 10 is provided with a side wall 14 adjacent the traction wheel 12 and a similar side wall 15 adjacent the wheel 13. A post 16 positioned upright upon the platform 10 is in spaced relation with respect to the side 14 and the axle of the traction wheel 12 is journaled in the post 16, and a stub post 17 adjacent the wall 14. The inner face of the traction wheel 12 is provided with a toothed gear wheel 19 in constant mesh with a pinion 20 which is fixed to a stub shaft 21 journaled at the top of the post 16 and upon which stub shaft 21 a driven gear 18 is also fixed.

The motor 11 is provided with rollers 22 and by means of which it is mounted upon the platform 10 between oppositely positioned parallel guide strips 23. A driving pinion 24 of the motor has a sprocket chain 25 passing thereover and also over the said driven gear 18, opposite balance or fly wheels 26 being also provided for the motor shaft 27. By this arrangement, it will be seen that when the motor is positioned at either end of the platform 10 as illustrated in Fig. 4, the chain 25 will be taut thus allowing for a transmission of power from the engine shaft to the traction wheel 12. The motor may be shifted upon the platform 10 to a central position as shown in Figs. 2 and 3 and at which times the chain will be slackened so that the chain will have no connection with the driving pinion 24 and the traction wheel will be uninfluenced by the motor. The motor may be placed at the opposite end of the platform from that shown in Fig. 4 and the same started in an opposite direction for imparting an opposite movement to the device. Pulleys 28 are positioned at the opposite ends of the platform 10 over which cords 29 are passed having their inner ends secured as at 30 to opposite points upon the motor 11. The opposite ends of these cords are attached at diametrically opposite points upon a disk pulley 31 positioned beneath the platform 10 and upon the lower end of an upright rod 32 journaled in the said platform and adapted for turning by means of a top hand wheel 33. The cords 29 may thus be wound upon the pulley 31 upon turning the wheel 33 and thus pulling the motor across the platform 10 for positioning the same at any point desired. A spring latch 34 carried by the journaling bushing 35 of the post 32 is adapted to retain the post against rotation at any point in the travel of the motor 11, such as the operative positions of the motor at the opposite ends of the platform. The smaller ground wheel 13 is journaled in a block 36 through which the wheel axle 37 extends and is vertically slidable within a bracket 38 being capable of adjustment therein by the operating turn screw 39, it being noted that the axle 37 extends through a vertically positioned slot 40 in the wall 15.

V-shaped frames 41 are hinged as at 42 to the corners at the opposite end of the platform 10 and have laterally extending journals 43 at their ends adapted for mounting thereon small steering wheels 44 which are capable of lateral movement in the steering operation. The axles 45 of each of the said wheels 44 are provided with steering rods 46 hinged to the said axles and having overlapping ends 47 spaced apart and provided with inwardly positioned toothed racks 48 in constant mesh with a pinion 49. The pinion 49 has an upright rod 50 secured thereto and journaled in a laterally extending arm 51 of the side wall 14. A gear 52 rigidly mounted upon the rod 50 is in mesh with worm gears 53 at the outer ends of rods 54 which are journaled in the opposite ends of a cross arm 55 of the said arm 51. The inner ends of the rods 54 have hand wheels 56 secured thereto which are positioned at points convenient for operation by the driver of the device upon the seats 57 thereof. It will thus be seen that upon whichever one of the seats 57, the driver may be positioned, he may by turning the adjacent one of the hand wheels 56 influence the two steering wheels 44 for steering the device in the desired direction.

Plow members 58 are positioned at each end of the platform 10 out of alinement with each other and pointing in the same direction, while similar plows 59 are alternately arranged with respect to the plows 58 and are pointed in an opposite direction. Each of the said plows 58 and 59 is attached by a chain 60 to some convenient portion of the framework of the device and whereby the plows are directed forwardly upon a movement of the device. It being only desired to employ only one set of plows when moving in each direction, the plows are each pivoted to the lower ends of separate elevating levers 61 and whereby the plows which are not desired for use may be elevated above the ground as illustrated in dotted lines in Fig. 7. The levers 61 are pivoted to brackets 62 carried by the framework and have their free ends adapted to be retained by clips 63 also carried by the platform and whereby the levers may be retained in their horizontal positions and with the plows elevated. The hinged frames 41 have slight rear extensions 64 which are adapted to engage the top of the platform 10 as illustrated at the right-hand end of said platform in Fig. 4, when the motor is positioned at that end thereof, while the similar frame at the opposite end of the platform will then be tilted at an inclination to the platform.

While the forms of the invention herein shown and described are what are believed to be the preferred embodiments thereof, minor changes may be made without departing from the spirit and scope of the invention as claimed.

It will be noted that the mechanism herein specifically described renders possible the movement of the motor plow in one direction as easy as in the opposite direction so that the plowing of an entire field or area is accomplished by driving the device thereacross in alternate directions while each path of travel effects the plowing of two uniform furrows. Such operations make it possible to plow a complete field without making any dead furrows, or back furrows. It will also be seen that for side-hill work, the relatively small and vertically adjustable wheel 13 is positioned upon the lower side of the plow and as the entire travel thereof is back and forth, the said wheel will be positioned at all times upon the lower side thereof which renders possible the adjustment of the screw device 39 for maintaining the platform 10 uniformly horizontal.

What I claim is:—

1. A device of the class described comprising a platform, a traction wheel journaled thereto, a post upon said platform, a stub shaft journaled in said post, a driven gear and pinion fixed to said stub shaft, operative engagement between said pinion and the traction wheel, a motor shiftably mounted upon said platform, a driving pinion for said motor, a sprocket chain over said driven gear and adapted for engaging said driving pinion when the motor is at its opposite extremes of movement.

2. A device of the class described, comprising a platform, a traction wheel journaled at one side of said platform, a ground wheel of lesser diameter than said traction wheel and journaled at the opposite side of the platform, vertical adjusting means for said ground wheel positioned upon said platform, a motor longitudinally slidable upon the platform, operative connections between the said motor and traction wheel releasable upon a central positioning of the motor and adjusting means upon the platform for slidably moving the said motor.

3. A device of the class described, comprising a platform, angular frames hinged to the opposite ends of the platform, steering wheels at the sides of said frame and at the ends thereof, a side wall upon said platform, a projecting arm at the top of said wall, a cross arm upon said projecting arm, projecting axles for said steering wheels, steering rods pivoted to the free ends of said axles and having spaced adjacent ends having toothed inner faces, a vertical rod journaled in said projecting arm, a pinion at the lower end of said vertical rod in mesh with the teeth of the said steering rods, a gear at the upper end of said vertical rod, steering members journaled at the opposite ends of the said cross arm, worms at the outer end of said steering members in mesh with the said rod gear, and hand turn wheels at the opposite ends of said steering members.

4. A device of the class described, comprising a platform, a traction wheel and a ground wheel at the opposite sides thereof, a shiftable balancing motor upon said platform, operative connections between said motor and traction wheel, means for longitudinally moving the said motor, frames hinged to the opposite ends of said platform, steering wheels at the opposite ends of said frames, and means for laterally moving the said steering wheels.

5. A motor plow comprising a frame, shiftable counterbalancing means upon the said frame for propelling the device in opposite directions and tiltably operably adjusting the said frame.

6. A device of the class described, comprising a vehicle frame, a traction wheel on said frame, a longitudinal guide-way upon the said frame, a motor slidably mounted within the said guide-way, a power pinion for the said traction wheel, a sprocket chain upon the said power pinion operatively connected to the said motor only when the motor is positioned at the limits of its sliding movement in a counterbalanced position at one end of the said frame.

In testimony whereof I affix my signature in presence of two witnesses.

ARCHIE J. BLAUVELT.

Witnesses:
JAY H. STEVENS,
ELLA M. BENNETT.

Copies of this patent may be obtained for five cents each, by addressing the "Commissioner of Patents, Washington, D. C."